United States Patent [19]  
Miyazaki et al.

[11] 3,979,337  
[45] Sept. 7, 1976

[54] CATALYST FOR REDUCING NITROGEN OXIDES

[75] Inventors: Kazuhide Miyazaki, Tanashi; Kiyomi Abe, Kokubunji, both of Japan

[73] Assignee: Mitsui Mining & Smelting Co., Ltd., Japan

[22] Filed: Mar. 21, 1974

[21] Appl. No.: 453,286

[30] Foreign Application Priority Data  
June 15, 1973 Japan................................. 48-66972

[52] U.S. Cl............................ 252/466 J; 252/474; 423/213.5
[51] Int. Cl.$^2$...................... B01J 21/04; B01J 23/72; B01J 23/74
[58] Field of Search................. 252/466 J, 474, 463, 252/472, 476; 423/213.2, 213.5

[56] References Cited  
UNITED STATES PATENTS

| | | | |
|---|---|---|---|
| 1,268,692 | 6/1918 | Dewar et al. | 252/474 |
| 2,696,475 | 12/1954 | Farrow | 252/472 X |
| 3,076,858 | 2/1963 | Frevel et al. | 252/474 X |
| 3,112,277 | 11/1963 | Michalko | 423/213.2 |
| 3,206,414 | 9/1965 | Gunther | 252/474 |
| 3,699,683 | 10/1972 | Tourtellotte et al. | 423/213.2 X |
| 3,702,236 | 11/1972 | Fessler | 423/213.2 |
| 3,737,396 | 6/1973 | Negra et al. | 252/466 J |
| 3,816,401 | 6/1974 | Hansford | 423/213.5 |
| 3,839,224 | 10/1974 | Yonehara et al. | 252/466 J |

FOREIGN PATENTS OR APPLICATIONS

| | | | |
|---|---|---|---|
| 565,632 | 11/1958 | Canada | 252/472 |

Primary Examiner—W. J. Shine  
Attorney, Agent, or Firm—Bucknam and Archer

[57] ABSTRACT

A process for the preparation of a catalyst for reducing nitrogen oxides, which comprises impregnating a heat-resistant carrier with at least one carboxylate of the iron group metals and copper, converting the impregnated metallic carboxylate to the metallic hydroxide and then reducing the metallic hydroxide to the metal thereby preparing the catalyst; and catalysts prepared by said process.

2 Claims, No Drawings

CATALYST FOR REDUCING NITROGEN OXIDES

This invention relates to a process for the preparation of catalyst and more particularly to a process for the preparation of a catalyst for reducing nitrogen oxides.

As is well known, nitrogen oxides (hereinafter referred to as "NOx") are among harmful materials emitted by burning fuels at high temperatures. Many studies have recently been made to find how to convert NOx to harmless materials and, as a result, it has been found that in the reduction of NOx to harmless materials such as nitrogen, carbonic acid gas and water with the use of carbon monoxide, hydrocarbons and the like, the reducing reaction is accelerated to some extent by the use of at least one member selected from the group consisting of the iron group metals i.e. iron, nickel and cobalt, and copper. There have heretofore been known conventional catalyst-preparing processes such as a process for compacting the powder of said metals in a mold by using a technique of powder metallurgy, a process for impregnating a suitable carrier with a solution of a water-soluble inorganic salt such as the chloride, sulphate or nitrate of said metals and then reducing the impregnated salt with a gas to precipitate the metal and a process comprising the same impregnating and reducing steps as above and a step of the conversion of the same salt as above to the corresponding hydroxide, the conversion step being carried out between the other two steps. The catalysts prepared by these conventional processes are unsatisfactory in initial activities and catalytic durability thereby making them unsuitable or impossible for practical applications.

The primary objects of this invention is to provide a process for preparing catalysts which are markedly reduced in such drawbacks as above, that is, have a high initial activity and satisfactory catalytic durability. This object is attained by impregnating a heat-resistant carrier with a solution of at least one carboxylic acid salt of a metal selected from the group consisting of the iron group metals and copper, converting the thus-impregnated carboxylic acid salt to the corresponding metallic hydroxide and then reducing the hydroxide with a gas to the corresponding metal.

The carriers which may be used herein are required to be heat-resistant to 1000°C or higher since the reducing reaction of NOx is usually carried out at temperatures of not lower than about 400°C and the reduction of the metallic hydroxide at temperatures of not lower than 800°C. Thus they may preferably include alumina, silica and other various heat-resistant ceramics and may also include heat-resistant natural rocks and heat-resistant metals. In addition, they should preferably be porous to be adapted for being impregnated and are required as a matter of course to have satisfactory strength and hardness, as carrier, that meet conditions under which they are used. They need not particularly be limited in shape.

The methods of impregnation, conversion to the hydroxide and reduction with a gas, which are employed in this invention, are not different from usual known ones; however, they will be briefed as follows.

The impregnating solutions are most generally used as aqueous ones and the concentrations thereof are not particularly limited. The concentrations, however, are preferably such that the amount of a solvent used is as small as possible so far as a uniform impregnation is attained, thereby simplifying the operation. If a single metallic salt to be used in this invention is not satisfactory in solubility, it may preferably be converted to a corresponding complex salt which is improved in solubility.

The metallic salt so impregnated in the carrier is converted to the hydroxide by reacting the impregnated salt with an alkaline solution of sodium hydroxide, potassium hydroxide or the like. More particularly the conversion is usually effected by immersing the carrier impregnated with the salt in an aqueous solution containing hydroxyl groups in amounts larger than the theoretical amount of hydroxyl groups required to convert said impregnated salt to the hydroxide and then agitating the solution with evolution of carbonic acid gas. The conversion is deemed to have ended when the evolution of carbonic acid gas has substantially ceased.

The reduction with a gas according to this invention is generally the reduction with hydrogen, and the reduction is deemed to have completed when the evolution of steam has substantially not been appreciated.

The catalysts thus obtained according to this invention have excellent initial activity and durability as compared with those containing the same metal as the above catalysts and being prepared by the conventional process. Among the catalysts produced by the process of this invention, those containing Fe, at least one of Ni and Co, and Cu in the ratios by weight of about 60–40 : 20–30 : 20–30 are particularly superior in catalytic performance.

This invention will be better understood by the following examples.

EXAMPLE 1

One hundred and fifty grams of ferric citrate were dissolved in 100 ml of a 14% ammonia water to form a solution which was impregnated in 100 g of spherical alumina pellets each having a 3-mm diameter. The alumina pellets so impregnated were dried, immersed in 100 ml of a solution of 150 g sodium hydroxide in one liter of water with the evolution of carbonic acid gas, withdrawn from the solution after the completion of evolution of carbonic acid gas, washed with water and dried, and then reduced with hydrogen at a flow rate of 10 l/min. and at 900°C for 1 hour (at this time the evolution of steam ceased) thereby to obtain a catalyst (Novel catalyst) containing 10% by weight of Fe according to this invention. For comparison, commercially available iron powder was compacted into spherical pellets of 3 mm in diameter (Comparative catalyst). These two kinds of catalysts were tested for their catalytic performance in terms of reduction ratio for NOx, the test being made under the following test conditions.

Gas tested: Exhaust gas discharged from a 6-cylinder engine of 1600-cc displacement, the engine being driven to correspond to driving a passenger car therewith at a speed of 80 Km/hr.

Composition of the gas: NOx, 1000 ppm; CO, 1.7%; and $O_2$, 1.2% Temperature of gas at entrance of catalyst bed: 600°C Space velocity: 35,000 $hr^{-1}$, 30,000 $hr^{-1}$ and 25,000 $hr^{-1}$ The results are indicated in Table 1.

Table 1

| Catalyst | Reduction Ratio for NOx by Fe Catalyst | | |
|---|---|---|---|
| | Space Velocity | 35,000 $hr^{-1}$ | 30,000 $hr^{-1}$ | 25,000 $hr^{-1}$ |
| Novel | | | | |

Table 1-continued

| Catalyst | Reduction Ratio for NOx by Fe Catalyst | | |
|---|---|---|---|
| Space Velocity | 35,000 hr$^{-1}$ | 30,000 hr$^{-1}$ | 25,000 hr$^{-1}$ |
| catalyst | 68% | 70% | 78% |
| Comparative catalyst | 55% | 60% | 65% |

Remarks:

Reduction ratio $$= \frac{NOx\ (ppm)\ in\ inlet\ gas - NOx\ (ppm)\ in\ outlet\ gas}{NOx\ (ppm)\ in\ inlet\ gas} \times 100\%$$

EXAMPLE 2

Seven hundred and fifty grams of ferric citrate were dissolved in 500 ml of a 14% ammonia water, 106 g of nickel acetate in 200 ml of water, and 78 g of copper acetate in 200 ml of water. These three solutions so obtained were mixed together to form an impregnating solution which was impregnated in one Kg of spherical alumina pellets each having a diameter of 3 mm. The thus-impregnated alumina pellets (the amount thereof prepared being about ten times as large as that prepared in Example 1) were then treated in the same manner as in Example 1 to obtain a catalyst (Novel catalyst) containing, by weight, 5% of Fe, 2.5% of Ni and 2.5% of Cu according to this invention.

For comparison, the following three catalysts (Comparative catalysts 1, 2 and 3) were separately prepared.

Comparative catalyst 1 : This catalyst was prepared by mixing with each other iron, nickel and copper powders in the ratio of 2 : 1 : 1 to form a mixture which was then compacted into spherical pellets of 3 mm in diameter.

Comparative catalyst 2 : This catalyst was prepared by the use of the process of this invention except that the step of conversion to hydroxide was omitted.

Comparative catalyst 3 : This catalyst was prepared by the use of the process of this invention except that the carboxylate of the metal used was substituted by the chloride thereof.

These four kinds of catalysts were tested under the same test conditions as in Example 1 to find their catalytic performance in terms of reduction ratio for NOx. The results are shown in Table 2.

Table 2

| Catalyst | Reduction Ratio for NOx by Fe-Ni-Cu Catalyst | | |
|---|---|---|---|
| Space Velocity | 35,000 hr$^{-1}$ | 30,000 hr$^{-1}$ | 25,000 hr$^{-1}$ |
| Novel catalyst | | 80% | 85% | 85% |
| Comparison catalyst 1 | 60% | 65% | 71% |
| '' 2 | 38% | 50% | 50% |
| '' 3 | 57% | 64% | 70% |

EXAMPLE 3

The same four kinds of catalysts as used in Example 2 were tested for change in their reduction ratio with the lapse of time of use of 0–100 hours, under the test conditions that the gas to be tested was the same as used in Example 2, the temperature of the gas at the entrance of the catalyst bed was 600°C and the space velocity was 30,000 hr$^{-1}$. The results are indicated in Table 3.

Table 3

| Catalyst | Change in Reduction Ratio for NOx by Fe-Ni-Cu Catalyst with the lapse of time of use thereof | | |
|---|---|---|---|
| Time of use | 0 hr. | 50 hrs. | 100 hrs. |
| Novel catalyst | 85% | 80% | 74% |
| Comparative catalyst 1 | 65% | 50% | 44% |
| '' 2 | 50% | 33% | Not tested |
| '' 3 | 64% | 37% | Not tested |

From the Examples it is clear that this invention provides a process for the preparation of NOx-reducing catalysts having superior initial activity and durability.

What is claimed is:

1. A catalyst prepared by impregnating a heatresistant carrier with a solution of an aliphatic monocarboxylate or an aliphatic tricarboxylate of the metals (1) iron, (2) at least one of nickel and cobalt and (3) copper, converting the thus impregnated monocarboxylate or tricarboxylates of said metals to the corresponding metal hydroxides with an alkaline solution and reducing said metal hydroxides with a reducing gas to the corresponding metals, said metals being contained in the ratio by weight of 60–40:20–30:20–30 respectively.

2. A catalyst as claimed in claim 1, wherein the carrier is composed substantially of alumina.

* * * * *